F. DURAND.
Cotton Gin.
No. 37,743. Patented Feb. 24, 1863.
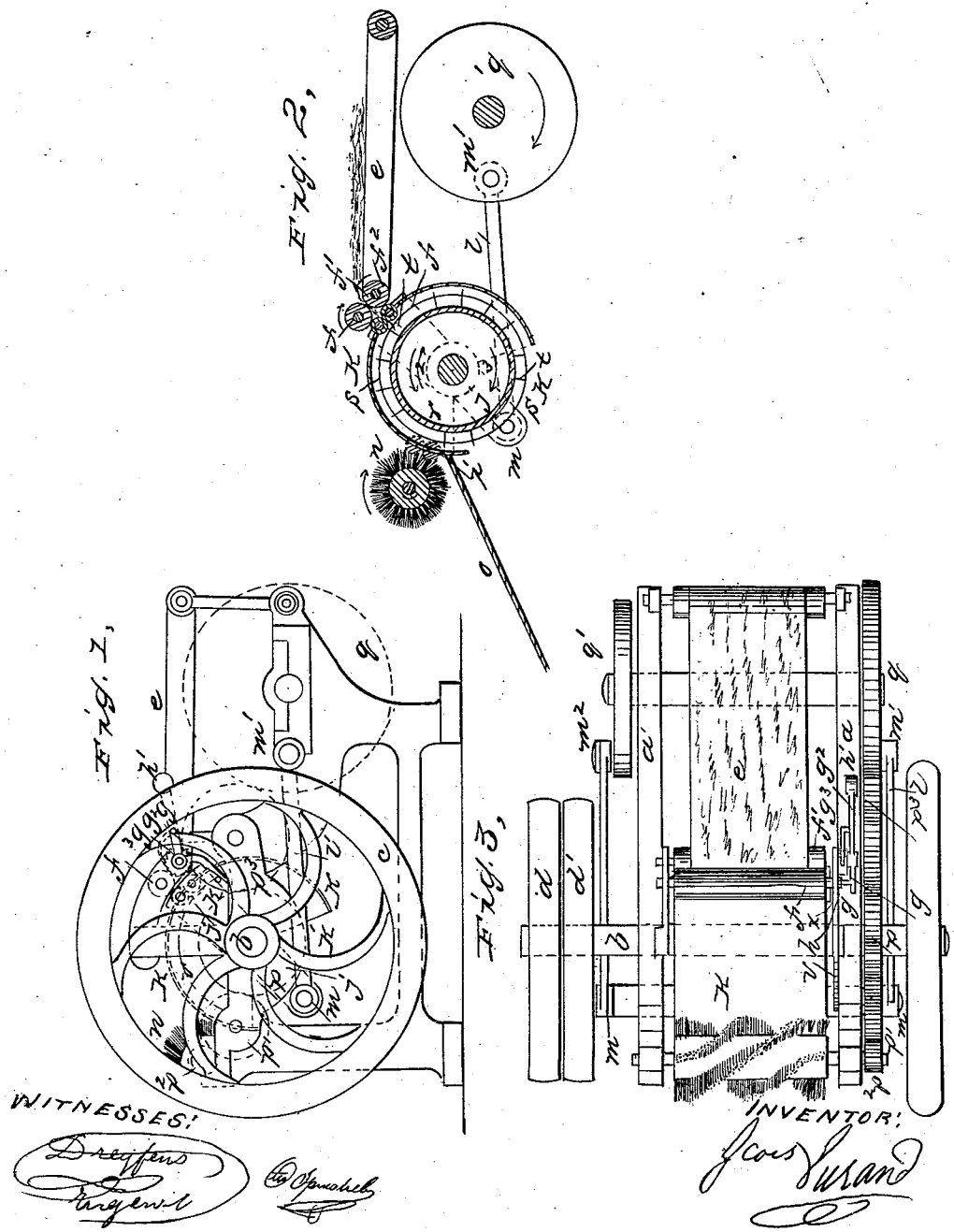

UNITED STATES PATENT OFFICE.

FRANÇOIS DURAND, OF PARIS, FRANCE.

IMPROVEMENT IN COTTON-GINS.

Specification forming part of Letters Patent No. 37,743, dated February 24, 1863.

*To all whom it may concern:*

Be it known that I, FRANÇOIS DURAND, of Paris, in the Empire of France, have invented an Improved Cotton-Gin; and I do hereby declare that the following is a full and exact description thereof, reference being had to the accompanying drawings.

The invention relates to an improved cotton gin or apparatus for cleansing raw cotton of the seeds.

In the annexed drawings, Figures 1 and 3 respectively represent a side elevation and a plan view of my improved cotton-gin, while Fig. 2 shows a longitudinal sectional view of some of its principal parts.

In these three figures corresponding parts are indicated by the same letters of reference.

The apparatus consists of a strong frame of wood, cast-iron, or other suitable material, formed of two side parts or cheeks, $a$ and $a'$, kept parallel to each other by suitable cross-stays. $b$ is the main arbor or driving-shaft, receiving motion from any suitable prime-mover, and provided for this purpose at one end with a fly-wheel, $c$, and at the opposite end with loose and fast pulleys $d$ and $d'$. $e$ is an endless cloth or feed-apron on which is laid the raw cotton or cotton-bolls from which the seeds are to be separated, the feeding or delivery of the bolls from this apron taking place by means of the revolution of two feed-rollers, $f$ and $f'$, covered with india-rubber or other suitable elastic material, which rollers in rotating suitably press the cotton-bolls for drawing the same forward, while the india-rubber coating allows the said rollers to yield sufficiently for the seeds to pass between them toward the two crushing-rollers, $i$ and $i'$. The endless apron $e$ is stretched over the revolving roller $e'$ and the lower feed-roller, $f'$, and its advancing motion takes place by the effect of a ratchet-wheel, $g$, fixed round the axis $f^2$ of the roller $f'$, and of the bell-crank lever $g'$ $g^2$, turning freely on this axis $f^2$, the curved or short arm $g'$ of which lever is at regular intervals depressed by the effect of a pin, $h$, (projecting from the outside of an arm, $j$, turning freely on the main arbor $b$,) thereby lifting the opposite arm $g^2$, causing a curved click or pawl, $g^3$, one end of which is connected to the arm $g^2$, to take with its opposite end the teeth of the ratchet-wheel $g$, thus causing this latter to advance for one step; after which the counter-weight $h'$ carries the arm $g^2$ down to its original position. The ratchet-wheel $g$, and consequently the feed-roller $f'$, fixed on the same axis $f^2$, are thus caused to rotate with a step-by-step motion commanded by that of the pin $h$, while by the effect of friction the upper feed-roller, $f$, is caused to revolve in the opposite direction of that of the lower one, $f'$, as shown by the arrows in Fig. 3. The cotton, after having passed between the rollers $f$ and $f'$, is taken hold of by the revolving rollers $i$ and $i'$, which latter should be made of metal or any other suitable or hard resisting material, as these rollers are intended to crush between them the cotton-seeds. The journals or ends of these feed and other rollers $f f'$ and $i i'$ turn in suitable brackets, those for the rollers $i i'$ situated in two cast-iron arms, $j$, turning freely round the main arbor $b$, and serving at the same time as bearers for a sheet-metal drum, $k$, fixed thereon, so as to cause this drum to follow the circular to-and-fro or reciprocating motion of the said arms $j$ in the manner as indicated by the arrows marked 1 and 2 in Fig. 2, the said reciprocating motion being communicated to the arms $j$ by means of two rods, $l$ and $l'$, connected to the pins $m$, projecting from the lower end of these arms $j$, the opposite end of the rod $l$ being connected to the pin $m'$ of a wheel, $q$, and that of the rod $l'$ to the pin $m^2$ of the disk $q'$, both wheel and disk being fixed to the same revolving arbor $q^2$, the wheel $q$ receiving motion (by means of the connecting-wheel $p^3$) from the wheel $p'$, fixed on the main arbor $b$. The reciprocating motion imparted to the arms $j$ will thus be communicated to the drum $k$ and to the rollers $i$ and $i'$, revolving in a corresponding slit in this drum, so as to cause these rollers to be moved to and fro from their original position opposite the feed-rollers $f$ and $f'$ to that shown in red ink in Fig. 2, opposite the helicoidal revolving brush $n$, the latter receiving its revolving motion from the wheel $p$ of the main arbor by means of connecting-wheel $p'$ and the pinion $p^2$, fixed on the arbor of the brush $n$.

In order to allow of better observing the internal parts of the machine and avoid confusion, the wheels $p$ $p'$ $p^2$, as also those $p^3$ and $q$, are indicated in red ink, in Fig. 1, by their circles of revolution.

On the arbor $b$ is fixed concentrically with the drum $k$ another drum, $r$, of cast-iron or other suitable resisting material, provided at one end with a flange, s, and round its outer surface with a series of radial equidistant metal blades, t, which latter, during the revolution of the drum r in the direction indicated by the arrow 3, will in rapid succession strike or beat the cotton protruding from between the rollers i and i', and thus cleanse the same entirely from the seeds, while when finally the cotton is in this manner arrived opposite the brush n, the revolution of this latter will cause the cleansed cotton to be projected on the inclined board o, whereas the seeds will during the advancing motion of the rollers i and i' escape through the open or lower part, k', of the drum k.

The rollers i and i', while participating of the circular reciprocating motion of the drum k, receive at the same time a suitable revolving motion by the following means: The spindle of the roller i is provided with a pinion, x, and that of the roller i' with another pinion, x', in gear with that x. These pinions are of the same diameter but of different width. The widest one, x, also is in gear with an indented sector, v, securely fixed against the inside of the cheek a of the frame of the machine, by which means, when the rollers i and i' are advancing toward the brush n, the roller i will be caused to revolve in one direction, and, when retrograding toward the feed-rollers f and f', in the opposite direction, whereas the roller i will constantly turn in the opposite direction of that of the roller i'. Consequently, when advancing toward the brush, the rollers i and i' will carry toward this latter a suitable quantity of cotton taken from the feed-rollers f and f', and allow this cotton to be taken off by the said brush, while, during the progress of the rollers i and i', the cotton-seeds, having already been crushed in passing through these rollers, will be easily removed or expelled from the cotton by the incessant beating of the blades t, after which the cleansed cotton will be caused to fall on the inclined delivery-board o, whereas the seeds will fall through the open or lower part, k', of the drum k.

Instead of one pair of rollers i and i', two or more pairs might be provided round the periphery of the drum k; or this drum, instead of a circular to-and-fro motion, might have a suitable revolving motion imparted to it, and receive the cotton-bolls from a suitable hopper, while the cleansed cotton might be delivered at one end of the drum by a helical screw or other suitable means.

Having thus described and particularly ascertained the nature of my invention and the manner in which the same is or may be carried into effect, I would observe, in conclusion, that I do not confine or restrict myself to the precise details of the above described and illustrated mechanical arrangement, as many variations may be made therefrom without deviating from the principles or main features of the invention; but

What I consider to be novel and original, and therefore claim as my invention, is—

1. In combination with the feeding rolls and brush, the carrying and crushing rolls i i', for taking the cotton from the feed-rolls to the brush, and at the same time crushing the seed therein, substantially as described.

2. In combination with the traversing and rotating carrying-rolls i i, the intermittently-feeding rolls f f', so that while the rolls i i' are not receiving cotton the feed-rolls shall be in a state of rest, substantially as described.

3. In combination with the traversing and rotating rolls i i', the drum k, and revolving beaters or blades t, made and operating together, substantially as described, and for the purpose set forth.

FRANÇOIS DURAND.

Witnesses:
DREYFOUS,
JAMES W. BROOKS.